United States Patent [19]

Rohman

[11] 4,063,334
[45] Dec. 20, 1977

[54] SPRING-TYPE FASTENER
[75] Inventor: Terrance J. Rohman, Joliet, Ill.
[73] Assignee: Caterpillar Tractor Co., Peoria, Ill.
[21] Appl. No.: 655,335
[22] Filed: Feb. 5, 1976
[51] Int. Cl.² .................. A44B 17/00; A44B 1/18
[52] U.S. Cl. ................... 24/213 B; 24/90 R; 24/73 R
[58] Field of Search .......... 24/73 HS, 73 SA, 73 AP, 24/73 PB, 206 A, 213 B, 213 CS; 248/74 B, 74 PB, 71

[56] References Cited
U.S. PATENT DOCUMENTS

| 1,850,713 | 3/1932 | Fox | 24/213 CS UX |
|---|---|---|---|
| 2,118,800 | 5/1938 | Smith | 24/213 B UX |
| 2,445,481 | 7/1948 | Wertz | 248/74 PB |
| 2,540,790 | 2/1951 | Kost | 24/213 B |
| 3,169,004 | 2/1965 | Rapata | 248/71 |
| 3,178,786 | 4/1965 | Rapata | 24/73 HS |
| 3,341,651 | 9/1967 | Odegaard | 248/74 PB X |
| 3,415,414 | 12/1968 | Gonzalez | 24/73 HS UX |
| 3,462,803 | 8/1969 | Horton | 24/90 HA UX |
| 3,606,649 | 9/1971 | Buttriss et al. | 24/735 A |

FOREIGN PATENT DOCUMENTS

| 1,193,266 | 4/1959 | France | 248/74 PB |
|---|---|---|---|
| 323,832 | 1/1930 | United Kingdom | 24/73 HS |

Primary Examiner—Paul R. Gilliam
Assistant Examiner—Victor N. Sakran
Attorney, Agent, or Firm—Wegner, Stellman, McCord, Wiles & Wood

[57] ABSTRACT

A fastening arrangement is provided which includes a spring clip or fastener and a retaining strap. The fastener is secured to a support member and has a plurality of outwardly extending shaped spring fingers. The retaining strap has a loop portion surrounding an element being held and has openings in each of the end portions which are adapted to snap over and be retained on the shaped spring fingers.

2 Claims, 6 Drawing Figures

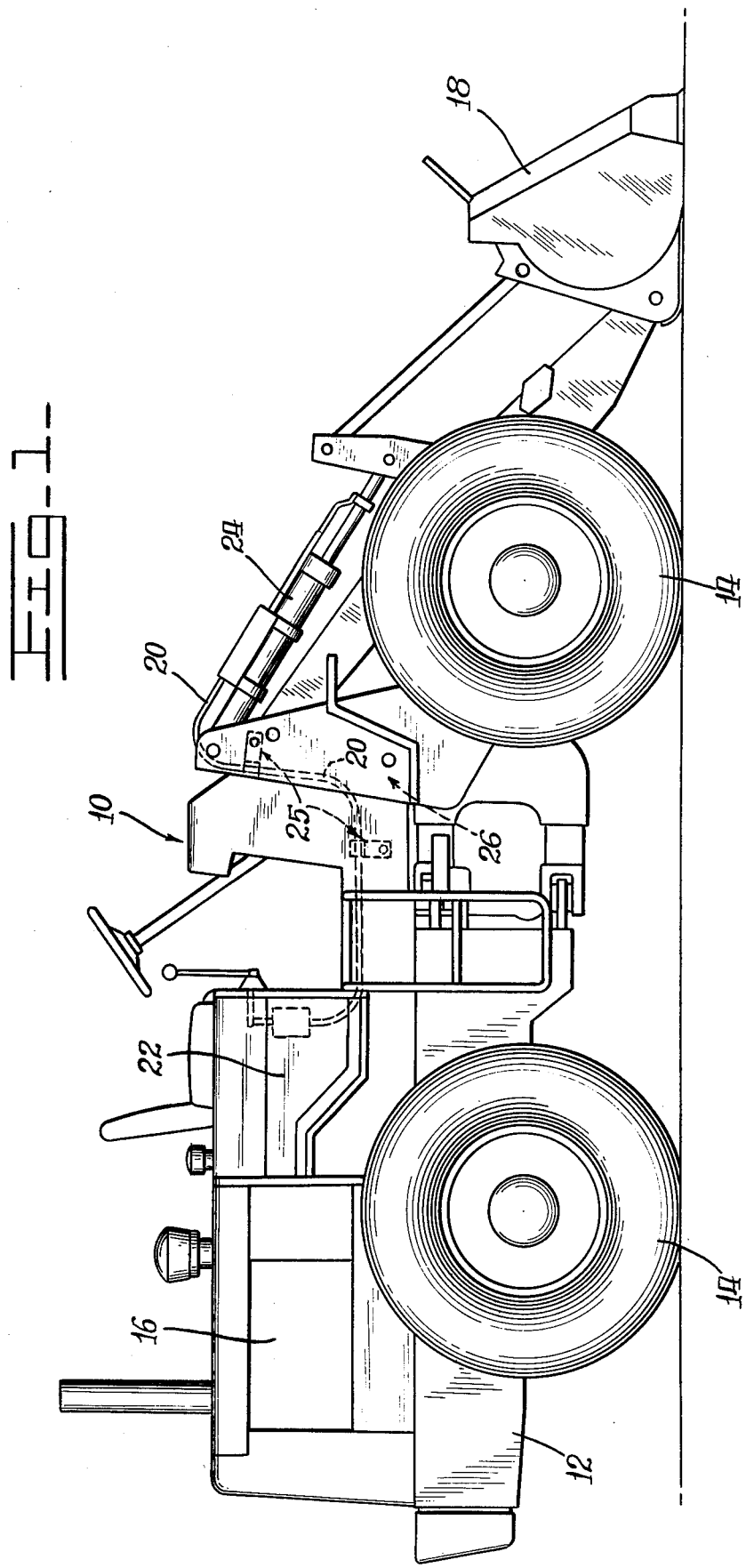

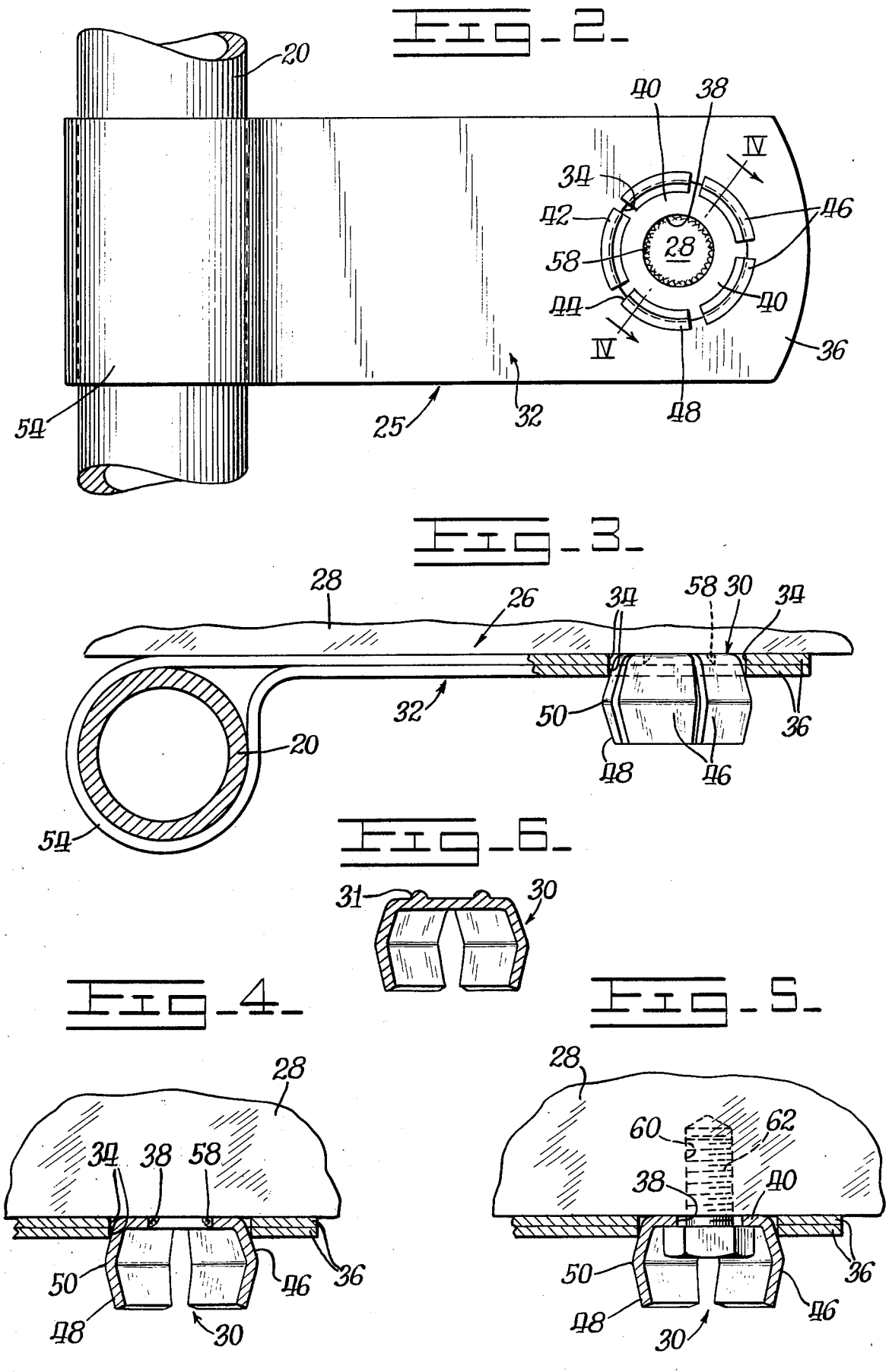

SPRING-TYPE FASTENER

BACKGROUND OF THE INVENTION

1. Field of the Invention

This invention relates to a fastening arrangement and, more particularly, to a combined fastener and retaining strap for supporting an element in position.

2. Description of the Prior Art

It is common practice where an element, such as a hose, wire, or the like, extends freely between two spaced locations to provide a fastening arrangement between the spaced locations to support the element. Such fastening arrangements usually entail drilling or tapping a hole into the surface adjacent the element and attaching a holder to the surface and to the element by means of a bolt, a washer, a lock washer and a nut. This arrangement requires many loose parts, requires additional time for drilling and installing the holder and, in many cases, the holder extends substantially outward from the surface and is exposed to damage and misuse due to its high profile.

SUMMARY OF THE INVENTION

An improved fastening arrangement is provided by welding, or the like, a low profile fastener directly to a surface close to the element to be supported. The fastener has a plurality of outwardly extending arcuately curved spring fingers. A retaining strap encircles the element, such as a hose, and is secured to the fastener by aligning apertures in the end portion of the retaining strap with the ends of the spring fingers and snapping said end portion of the retaining strap past the arcuately curved portions of the fingers whereupon the retaining strap is secured to the fastener and the element, such as a hose, is supported relative to the adjacent surface.

The improved fastening arrangement elimiantes excess hardware, such as nuts, lock washers and the like, and reduces assembly time and effort by requiring only snapping the retaining strap onto the fastener. In at least one version of the invention, no drilling of the adjacent surface is necessary. The fastener and retaining strap are of low profile reducing the possibility of accidental damage thereto by moving objects passing too close. The fastening arrangement affects cost savings in both time and material and has its best application in securing wiring harnesses and tubing or hoses with low surge in minimum vibration areas.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a wheel loadertype vehicle illustrating, in dotted lines, the invention in use;

FIG. 2 is a plan view of an improved fastener arrangement in use supporting a length of tubing;

FIG. 3 is a side view of the fastener arrangement shown in FIG. 2 with parts broken away and in section;

FIG. 4 is a cross-sectional view through the spring fastener taken along the lines 4—4 of FIG. 2;

FIG. 5 is a cross-sectional view of a modified form of attachment; and,

FIG. 6 is a cross-sectional view of another modified form of attachment.

DESCRIPTION OF THE PREFERRED EMBODIMENT

Referring to the drawings, and in particular FIG. 1, a wheel loader-type vehicle 10 is illustrated which is comprised of a frame 12, upon which a plurality of wheels 14 is mounted, an engine 16 is carried by the frame 12 for driving the wheels 14 and for providing hydraulic power for raising, lowering and tilting a front-mounted bucket 18. Although a wheel loader is illustrated, it is contemplated that the present invention can be used on any vehicle or any machinery or apparatus where electric cables, electric lines, hydraulic lines, hoses or tubes, or the like, extend between two spaced locations so that the expanse of cable, line or tubing between the spaced locations is secured and/or supported to prevent accidental damage to the cable, line or tubing. In FIG. 1, in dotted lines, is shown a hydraulic line or tube 20 extending from the engine compartment 22 to the hydraulic cylinders 24 for actuating the bucket 18. Between the two spaced locations, a relatively long expanse of line or tube 20 exists. The line or tube 20 passes parts of the vehicle that are moving or are movable that might catch the tube 20 and damage same. In addition, the tube passes through and around fixed members such that relative movement between the tube and the fixed members can abrade and cause damage or failure of the tube. Two fastening arrangements 25, embodying the present invention, are illustrated as securing the line or tube 20 to a support 26 between the spaced locations.

The fastening arrangement 25 is illustrated, more in detail, in FIGS. 2, 3 and 4 wherein a spring clip or fastener 30 is attached to the support or housing 26 and a retaining strap 32 is passed around the line or tube 20 and is secured to the spring clip or fastener 30 by forcing the spring clip or fastener 30 through aligned openings or apertures 34 in the end portions 36 of the retaining strap 32.

Specifically, the spring clip or fastener 30 is somewhat cup-shaped and has an aperture 38 through the base portion 40 thereof. The outwardly projecting walls 42 of the cup are slotted at 44 so as to provide a plurality of outwardly extending, arcuately curved spring fingers 46. Each spring finger 46 is spaced from the adjoining spring fingers by an amount sufficient to permit the outer or remote end portions 48 of the spring fingers 46 to be deflected radially inwardly toward each other during assembly of the retaining strap 32 with the spring clip 30. Each finger 46 is arcuately or radially bow-shaped from the base portion 40 to the outer end portion 48 with an elbow 50 of the bow being located generally medially between the base 40 and the outer end portion 48 of the fingers 46. The bow-shape of the fingers provides a radially enlarged midportion. The spring clip or fastener 30 is made of a resilient material, such as a spring steel, or the like. Under certain circumstances, it is possible that the spring clip or fastener 30 could be molded of some of the tougher materials with a memory, such as polycarbonate, or the like, wherein sufficient resilience is afforded to the spring fingers 46 to permit them to be deflected for assembly and still return to their initial position to retain the ends of the retaining strap 32 thereon.

The retaining strap 32, as shown, is made of metal and is elongate in one direction. The retaining strap may be made of a material that is relatively rigid so that the loop 54 at the midportion thereof retains its shape for fitting around the desired tube or line 20. In the alternative, the material of the retaining strap 32 can be softer-type metal so that the loop 54 in the retaining strap may be shaped on the job to conform with the element 20 being supported prior to assembly of the retaining strap 32 to the spring clip or fastener 30. The end portions 56 of the retaining strap 32 have apertures or openings 34 formed therethrough, which apertures 34 should be substantially equal in diameter. The diameter of the apertures 34 should be such as to encircle the outer end portions 48 of the spring fingers 46 of the spring clip 30 so that pressure on the end portions 56 of the retaining strap 32 will deflect the radially enlarged midportions of the spring fingers 46 inwardly until the walls of the apertures 34 in the retaining strap 32 pass beyond the elbows 50 in the spring fingers 46. The size of the apertures 34 in the retaining strap 32 should be such as to seat behind the elbows 50 in the spring fingers 46 between the elbows 50 and the support surface 28 so that the retaining strap 32 is retained assembled with the spring clip or fastener 30 once the retaining strap 32 is snapped past the elbows 50 of said spring fingers 46.

The spring clip or fastener 30 is secured to the support by means of welding 58, as shown in FIG. 4, which welding may be a resistance weld, such as is used on vehicles or machinery of the type here involved, for welding studs to various portions of the frame or body thereof.

In practice, it has been found desirable to assemble the retaining strap 32 to the portion of the tube or line 20, where desired, and then mark on the support structure the location of where the apertures line up on the support. The retaining strap 32 is then pivoted away from the support structure while the spring clip or fastener 30 is welded into the proper position on the support. The retaining strap 32 has the apertures 34 aligned with the outer ends 48 of the spring fingers 46 whereupon the retaining strap 32 is snapped into position on the spring clip or fastener by forcing the end portions 56 past the elbows 50. In the alternative, the spring clips or fasteners 30 may be spotted at strategic locations on the support structure and the lines or tubes 20 are then shaped to run close to the spring clips 30 in such a way that a retaining strap 32, when wrapped around the tube or line 20, may be readily assembled by snapping the end portions 56 over the elbows 50 of the spring clip to support the tube or line in position.

Due to the low profile of the spring clip 30, that is, due to the relatively short, outwardly extending dimension of the spring fingers 46, the spring clip 30 is not likely to be bumped or accidentally damaged by virtue of moving elements passing thereby.

FIG. 5 shows one modified version of the invention wherein a hole 60 is tapped in the support structure 28 and a bolt 62 is threaded through the opening 38 in the spring clip or fastener 30 and into the tapped hole 60 in the support so as to affix the spring clip or fastener 30 on the support. The use of the spring clip 30, with respect to a retaining strap 32, is the same for this version as for the version shown in FIGS. 2 through 4. The bolt 62 may be a self-tapping type bolt or may be a conventional bolt threaded into the tapped hole 60 in the support.

Also, the fastener 30 could be made as shown in FIG. 6, wherein the fastener has resistance weld projections 31 formed thereon. In that instance the fastener would not require an aperture therethrough thus strengthening the part considerably.

Using the present invention, it is not necessary to stock nuts and bolts and washers and lock washers of the type used heretofore to secure tubes or lines 20 to a support structure 28. Securing the spring clip or fastener 30 to the support structure is faster and quicker than drilling and inserting bolts, lock washers, washers and nuts on the support structure. Mounting the spring clip 30 on the support and assembling the retaining strap 32 with the tube or line 20 and snapping the retaining strap 32 on the spring clip 30 is simple, fast and efficient, all of which contributes to a saving in time and material thereby reducing the cost of the assembly operation. The fastening arrangement employing the spring clip or fastener 30 and retaining strap 32, as described hereinabove, has been found to be highly reliable, dependable and effective.

I claim:

1. In a fastening arrangement for positioning a loose element relative to a support comprising a fastener having a substantially circular base portion with a predetermined diameter, a plurality of closely adjacent outwardly extending spring members resiliently connected to said base portion and terminating in outer end portions, said spring members being radially bow-shaped and providing a radially enlarged midportion to the fastener between the base portion and the outer end portions, the diameter of the fastener at the midportion of the spring members being greater than the diameter of said base portion, means for securing the base portion of said fastener to said support, a retaining strap having an intermediate portion encircling the loose element, each end portion of said strap having an aperture therethrough of a size conforming to the diameter of the base portion of said fastener, the enlarged diameter midportion of the spring members of the fastener passing with resistance through said apertures in the strap as the end portions of the strap are secured to said fastener for retaining said element in place relative to said support.

2. In a fastening arrangement as claimed in claim 1 wherein said means for securing the fastener to said support is by welding said base portion to said support.

* * * * *